US010707975B2

(12) United States Patent
Pratt et al.

(10) Patent No.: US 10,707,975 B2
(45) Date of Patent: Jul. 7, 2020

(54) USE OF COHERENT SIGNAL DISPERSION FOR SIGNAL SOURCE ASSOCIATION

(71) Applicant: University of Notre Dame du Lac, Notre Dame, IN (US)

(72) Inventors: Thomas G. Pratt, Niles, MI (US); Robert Daniel Kossler, South Bend, IN (US); Jeffrey G. Mueller, South Bend, IN (US); Joseph Lawrence Loof, Notre Dame, IN (US)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 0 days.

(21) Appl. No.: 15/134,370

(22) Filed: Apr. 20, 2016

(65) Prior Publication Data

US 2017/0019193 A1 Jan. 19, 2017

Related U.S. Application Data

(60) Provisional application No. 62/150,155, filed on Apr. 20, 2015, provisional application No. 62/150,145, filed on Apr. 20, 2015, provisional application No. 62/325,434, filed on Apr. 20, 2016.

(51) Int. Cl.
*H04B 17/27* (2015.01)
*H04B 7/08* (2006.01)
*H04B 17/12* (2015.01)

(52) U.S. Cl.
CPC ........... *H04B 17/27* (2015.01); *H04B 7/0851* (2013.01); *H04B 17/12* (2015.01)

(58) Field of Classification Search
CPC ....... H04B 17/27; H04B 17/12; H04B 7/0851

USPC .......... 375/136; 370/329; 455/63.1; 342/435
See application file for complete search history.

(56) References Cited

U.S. PATENT DOCUMENTS

| 4,516,220 A | 5/1985 | Baumann |
| 6,915,077 B2 * | 7/2005 | Lo ........................ H04B 10/532 |
| | | 398/184 |
| 9,325,436 B2 | 4/2016 | Pratt et al. |
| 2002/0196185 A1 * | 12/2002 | Bloy ........................ G01S 3/04 |
| | | 342/435 |

(Continued)

OTHER PUBLICATIONS

Arfken, "Mathematical Methods for Physicists," 6th ed. Orlando, FL, USA: Academic Press, pp. 1195, 2005.

(Continued)

*Primary Examiner* — Fitwi Y Hailegiorgis
(74) *Attorney, Agent, or Firm* — Knobbe, Martens, Olson & Bear, LLP

(57) ABSTRACT

A signal source association method and receiver. A receiver can be used to detect a plurality of signals transmitted from a plurality of transmission sources. The receiver can determine amplitude and phase information for a plurality of frequency components of each of the plurality of signals. The receiver can also determine a set of comparison values by comparing the respective amplitude and phase information from one or more pairs of the plurality of signals. Finally, the receiver can associate one of the signals with one of the plurality of transmission sources using the set of comparison values. The comparison values can comprise Stokes parameters and the one or more pairs of the plurality of signals can comprise a pair of orthogonally polarized signals or a pair of signals detected from spatially-separated antennas.

24 Claims, 12 Drawing Sheets

(56) References Cited

U.S. PATENT DOCUMENTS

| | | | | |
|---|---|---|---|---|
| 2005/0183887 A1* | 8/2005 | Rodney | ............... | E21B 47/04 |
| | | | | 175/26 |
| 2005/0239406 A1* | 10/2005 | Shattil | ............... | H01Q 3/26 |
| | | | | 455/63.1 |
| 2006/0273255 A1* | 12/2006 | Volkov | ............... | G01S 7/024 |
| | | | | 250/336.1 |
| 2013/0054603 A1* | 2/2013 | Birdwell | ............ | G06K 9/6224 |
| | | | | 707/738 |
| 2015/0257165 A1* | 9/2015 | Gale | ............... | H04B 1/1036 |
| | | | | 370/329 |
| 2015/0293162 A1* | 10/2015 | Tsukamoto | ....... | G01R 29/0892 |
| | | | | 702/67 |

OTHER PUBLICATIONS

Barton, Geoffrey J., "An Efficient Algorithm to Locate all Locally Optimal Alignments Between Two Sequences Allowing for Gaps," Computer Applications in the Biosciences, vol. 9, No. 6, pp. 729-734, Dec. 1993.

Chandra et al., "Eem data processing: Parametric deinterleaving approach," IEEE Region 10 Conference, pp. 26-30, 1992.

Chandrasekhar, S., "Radiative Transfer," Dover Publications, New York, NY, USA, 1960, pp. 415. [Uploaded in 3 parts].

Gee, "Radar warning receiver (rwr) time-coincident pulse data extraction and processing," IEEE Radar Conference, pp. 0752-0757, May 2012.

Hartigan et al., "A K-Means Clustering Algorithm," Journal of the Royal Statistical Society, Series C (Applied Statistics), vol. 28, pp. 100-108, 1979.

Kocamiş et al., "A clustering approach for radar warning receivers," Signal Processing and Communications Applications Conference, pp. 2517-2520, May 2015.

Kuhn, "The hungarian method for the assignment problem," Naval Research Logistics Quarterly, vol. 2, pp. 83-97, 1955.

Lei et al., "Blind Separation of Synchronous-Networking Frequency Hopping Signals Based on Time-Frequency Analysis," The 9th International Conference on Future Networks and Communications (FNC-2014), Procedia Computer Science 34, 2014, pp. 31-38.

Ansari et al., "Parade: A Versatile Parallel Architecture for Accelerating Pulse Train Clustering," Symposium on Application Specific Processors, 2009, vol. 7, pp. 88-93.

Ata'a et al., "Deinterleaving of Radar Signals and PRF Identification Aignals," IET Radar Sonar Navigation, Nov. 2007, vol. 1, pp. 340-347.

Banasiak et al., "SACD Algorithm of Pulse Stream Analysis," Microwaves, Radar and Wireless Communications, 2008, vol. 17, pp. 1-4.

Belouchrani et al., "Blind Source Separation Based on Time-Frequency Signal Representations," IEEE Transactions on Signal Processing, Nov. 1998, vol. 46, No. 11, pp. 2888-2897.

Bhattacharyya, "On a Measure of Divergence Between Two Statistical Populations Defined by their Probability Distributions," Bulletin of the Calcutta Mathematical Society, 1943, vol. 35, pp. 99-109.

Chen et al., "Feature Extraction Using Surrounding-Line Integral Bispectrum for Radar Emitter Signal," 2008 International Joint Conference on Neural Networks (IJCNN 2008), pp. 294-298.

Danielsen et al., "The Application of Pattern Recognition Techniques to ESM Data Processing," IEEE Colloquium on Signal Processing for ESM Systems, Apr. 1988, pp. 6/1-6/4.

Guo et al., "Multiple-Parameter De-Interleaving System in ESM Data Processing Scheme," Proceedings of the Fifth International Conference on Machine Learning and Cybernetics, Aug. 13-16, 2006, pp. 2497-2502.

Guo et al., "SVC & K-Means and Type-Entropy Based De-Interleaving/Recognition System of Radar Pulses," IEEE International Conference on Information Acquisition, Proceedings of the 2006 IEEE International Conference on Information Acquisition, Aug. 20-23, 2006, pp. 742-747.

Hassan et al., "Joint Deinterleaving/Recognition of Radar Pulses," Proceedings of the International Radar Conference, Sep. 2003, pp. 177-181.

Jun et al., "A Novel Deinterleaving Algorithm of Radar Pulse Signal Based On DSP," IEEE International Symposium on Industrial Electronics, , Jul. 5-8, 2009, pp. 1899-1903.

Lee et al., "Pulse Train Deinterleaving: Algorithms and Cost Criteria," IEEE International Conference on Acoustics, Speech, and Signal Processing, Mar. 1999, vol. 5, pp. 2475-2478.

Logothetis et al., "An Interval-Amplitude Algorithm for Deinterleaving Stochastic Pulse Train Sources," IEEE Transactions on Signal Processing, May 1998, vol. 46, No. 5, pp. 1344-1350.

Mahalanobis, P.C., "On the Generalised Distance in Statistics," Proceedings National Institute of Sciences of India, Apr. 15, 1936, vol. 2, No. 1, pp. 49-55.

Milojević et al., "Improved Algorithm for the Deinterleaving of Radar Pulses," IEE Proceedings-F, Feb. 1992, vol. 139, No. 1, pp. 98-104.

Moore et al.,"Deinterleaving Pulse Trains Using Discrete-Time Stochastic Dynamic-Linear Models," IEEE Transactions on Signal Processing, Nov. 1994, vol. 42, No. 11, pp. 3092-3103.

Nadakuditi et al., "Simple Eigenvalue Based Detection of High-Dimensional Signals in White Noise Using Relatively Few Samples," IEEE Transactions on Signal Processing, Jul. 2008, vol. 56, No. 7, pp. 2625-2638.

Perkins et al., "Pulse Train Deinterleaving Via the Hough Transform," IEEE International Conference on Acoustics, Speech, and Signal Processing, Apr. 1994, vol. 3, pp. III/197-III/200.

Pu et al., "Reliability Evaluation of ESM Deinterleaver Based on Sorted DOA Difference," International Symposium on Antennas, Propagation and EM Theory, Nov. 2008, vol. 8, pp. 1434-1437.

Rogers, Ph.D. "ESM Processor System for High Pulse Density Radar Environments," IEE Proceedings, Dec. 1985, vol. 132, Pt. F, No. 7, pp. 621-625.

Taowei et al., "Feature Extraction Using Autocorrelation Function for Radar Emitter Signals," Cross Strait Quad-Regional Radio Science and Wireless Technology Conference, Jul. 26-30, 2011, vol. 2, pp. 1371-1374.

You et al., "A Novel Algorithm for BSS of Frequency-Hopping Signals Based on Time Frequency Ratio," The 1st International Conference on Information Science and Engineering (ICISE 2009), 2009, vol. 1, pp. 2478-2480.

* cited by examiner

MAP 1

MAP 2

MAP 6

USE OF COHERENT SIGNAL DISPERSION FOR SIGNAL SOURCE ASSOCIATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to U.S. Provisional Patent Application No. 62/150,155, filed Apr. 20, 2015, and entitled "METHOD AND APPARATUS FOR SIGNAL SOURCE ASSOCIATION," and to U.S. Provisional Patent Application No. 62/150,145, filed Apr. 20, 2015, and entitled "METHOD AND APPARATUS FOR SIGNAL SOURCE ASSOCIATION," and to U.S. Provisional Application No. 62/325,434, filed Apr. 20, 2016, and entitled "USE OF COHERENT SIGNAL DISPERSION FOR SIGNAL SOURCE ASSOCIATION," the entirety of each of which is hereby incorporated by reference herein.

STATEMENT REGARDING FEDERALLY SPONSORED R&D

This invention was made with government support under contract N00014-15-1-2010 awarded by the U.S. Office of Naval Research. The government has certain rights in the invention.

BACKGROUND

Field

The field of this disclosure relates to the association of received signals with the corresponding respective transmission sources from which they originate.

Description of the Related Art

Radio frequency receivers are typically capable of detecting signals transmitted from multiple different transmission sources. When a receiver is located in an environment where multiple transmission sources are active, it can be advantageous for the receiver to have the capability of associating a given signal which it has detected with the particular transmission source that sent the signal.

SUMMARY

In some embodiments, a signal source association method comprises: using a receiver to detect a plurality of signals transmitted from a plurality of transmission sources; determining amplitude and phase information for a plurality of frequency components of each of the plurality of signals; determining a set of comparison values by comparing the respective amplitude and phase information from one or more pairs of the plurality of signals; and associating one of the signals with one of the plurality of transmission sources using the set of comparison values. The comparison values can comprise Stokes parameters and the one or more pairs of the plurality of signals can comprise a pair of orthogonally polarized signals or a pair of signals detected from spatially-separated antennas.

In some embodiments, a receiver for performing signal source association comprises: two or more input ports for obtaining a plurality of signals transmitted from a plurality of transmission sources; and a processor configured to determine amplitude and phase information for a plurality of frequency components of each of the plurality of signals; determine a set of comparison values by comparing the respective amplitude and phase information from one or more pairs of the plurality of signals; and associate one of the signals with one of the plurality of transmission sources using the set of comparison values.

DETAILED DESCRIPTION

The following disclosure includes several sections, some of which correspond to articles which have been provided in the provisional patent applications to which this application claims priority. The bibliographies referenced in these sections can be found in the provisional applications. Each of the referenced documents is hereby incorporated by reference herein in its entirety. Further, the numbering of subsections, equations, and tables may begin anew in each section.

This disclosure describes systems and methods for, in environments where multiple transmission sources are active, associating a given signal detected by a receiver with the particular transmission source that sent the signal. As discussed herein, coherent signal dispersion information (including polarization mode dispersion information) can be used to make such associations.

Figure 1:
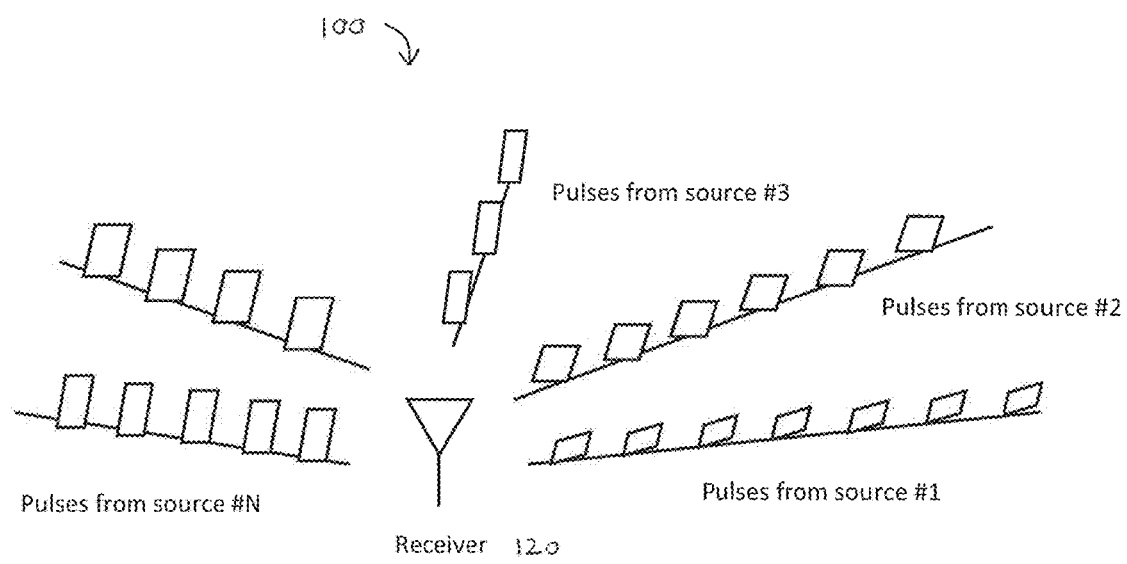
FIG. 1 illustrates a receiver located in an environment that includes multiple transmission sources.

FIG. 1 illustrates a receiver 120 located in an environment 100 that includes multiple transmission sources. Five signals are shown being transmitted from five separate transmission sources. But, in general, the environment 100 could include any number of transmission sources. As shown in FIG. 1, the signal from each transmission source can include a series of pulses. The receiver 120 can associate each of the pulses with a given transmission source if it has adequate information regarding the characteristics of the signal sent by each transmission source. Such characteristics could include, for example, carrier frequency, pulse width, pulse amplitude, angle of arrival, etc. If such characteristics are unknown, or if the same signal characteristics are shared by multiple transmission sources, then it can become difficult for the receiver 120 to associate any given pulse which it receives with the particular transmission source that sent that particular pulse. New techniques for making such signal source associations are therefore advantageous.

The techniques described herein generally use coherent signal dispersion information (including polarization mode dispersion information) in order to associate a given signal or pulse with its transmission source. These techniques can be used on a variety of signals, including communications signals, radar signals, etc. One example of interest relates to transmission sources which employ frequency-hopping (FH) techniques. For example, the transmission sources shown in FIG. 1 may use a frequency-hopping technique whereby each transmission source switches amongst many frequency channels using a different pseudorandom hop sequence. Thus, each of the illustrated pulses from each individual transmission source can be transmitted using a different sub-band carrier frequency. If the receiver 120 is privy to the frequency-hopping sequence employed by each transmission source, then it may be possible to associate each received pulse with the particular transmission source from which it originated. If, however, the receiver 120 is not privy to such information, then it can become difficult to associate each received pulse with the particular transmission source from which it originated. Notwithstanding such lack of information, however, the techniques described herein can nevertheless still be used to associate received pulses with their respective transmission sources.

Frequency-hopped communications are used in both military and commercial applications. Frequency hopped signaling is sometimes favored in applications due to its resilience to interference and its anti-jam benefits. Military examples include the Single Channel Ground and Airborne Radio System (SINCGARS) and AN/PRC-150 radios. Commercial applications include Bluetooth communications, which shares the ISM band with direct-sequence spread spectrum (DSSS) signals, and Orthogonal Frequency-Division Multiplexing (OFDM) based signals.

A network of frequency hopped signals can be asynchronous or synchronous. Asynchronous signals do not necessarily share a common time clock, and their times of transmission, dwell periods, and frequency sets can be different amongst different transmission sources. These distinguishing characteristics may facilitate source association. The term synchronous, as used herein, implies that the signals may have indistinguishable hop rates, hop dwell times, and frequency sets, and may not exhibit timing differences that can be exploited by a passive receiver for signal discrimination. Synchronous systems may yield dwells with overlapping pulses from the transmission sources, and hence discrimination techniques using the aforementioned parameters are not generally applicable.

In a network consisting of multiple frequency-hopped signals, passive receivers can be used to blindly separate FH signals. The most common properties used for FH signal separation are time of arrival (TOA), pulse width (PW), hop frequency (PF), direction of arrival (DOA), pulse amplitude (PA), and pulse repetition interval (PRI). While these can be sufficient to separate two signals, in the case of perfectly synchronous signals in frequency-selective channels, these signal features may not provide enough information to identify which signal pulse came from which emitter. The signal source association techniques described herein, which employ coherent signal dispersion information (including polarization mode dispersion information), can nevertheless be used even in synchronous frequency-hopping networks. They can also be used in asynchronous networks.

In some embodiments, this disclosure describes a passive sensing method for associating frequency-hopped signals with the transmission source from which each signal originates. In contrast to the flat fading conditions typically employed in frequency hopping mixing matrix estimators, this disclosure considers frequency-selective propagation channels, where channel gains are a function of the hop frequency, and where direction-of-arrival methods are challenged by the presence of a multipath channel. The techniques described herein can be used even in the case of synchronous time hopping which may prevent relative timing information between source signals from being exploited by the passive receiver. Instead, discrimination of the sources is based on coherent signal dispersion characterizations (which include polarization-frequency characterizations), leveraging coherent signal dispersion associated with each propagation channel.

In some embodiments, during a training period, a passive receiver employs one or more dual-polarized antennas to collect orthogonally-polarized complex baseband signals, identifies the hopped signal frequencies within the pulses, and measures coherent signal comparison values, such as polarization values. These values may be, for example, 4-element or 3-element Stokes parameters for each of these frequencies. The receiver can collect a number of pulses and perform clustering at each frequency sub-band using the amplitude and polarization values; for some sets, k-means clustering proves to be acceptable. This clustering operation during a training period results in formation of dispersion curves across sub-bands for each source. These curves can be used to assign future pulses to their respective transmission sources. In the classification of subsequent source signals, associations may be made using a minimum distance measure to the curves. This process is generally described herein for a two-emitter system, but the problem can be extended to any number of emitters.

Polarization Mode Dispersion in Multipath Channels

The systems and methods described herein are particularly useful for analyzing signals that have propagated from a transmitter to a receiver through a frequency-selective channel, such as a multipath channel, in order to associate a received pulse with its respective transmitter. These systems and methods can take advantage of, for example, multipath propagation effects, as discussed with respect to FIG. 2.

Figure 2:
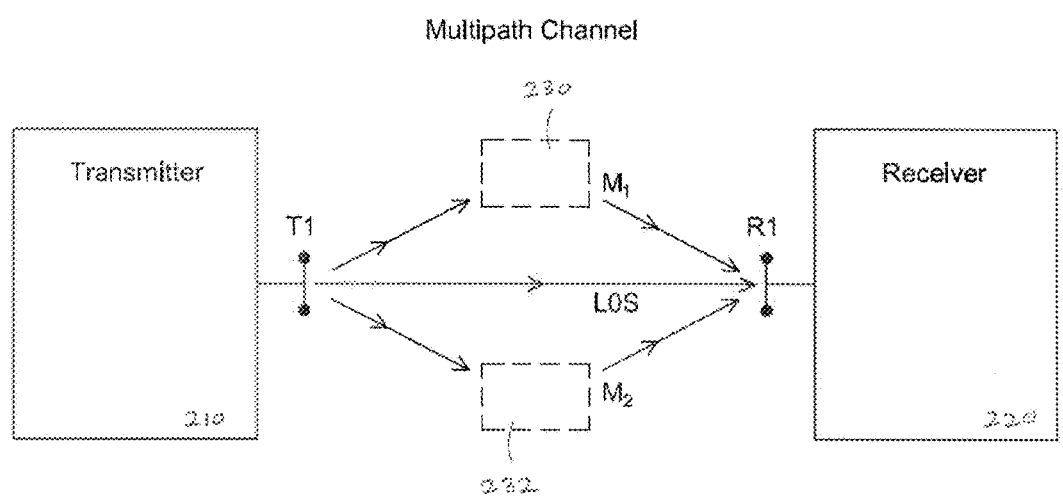
FIG. 2 illustrates a radio frequency (RF) transmitter and receiver operating in a multipath channel.

FIG. 2 illustrates a radio frequency (RF) transmitter 210 and receiver 220 operating in a multipath channel The transmitter 210 includes an antenna Ti which transmits RF waves into the multipath channel. The RF waves are received by the receiver antenna R1. The multipath channel includes one or more targets 230, 232 which reflect, refract, diffract, scatter, or otherwise cause the transmitted radio waves to arrive at the receiver antenna R1 along multiple paths.

In the illustrated example, RF waves from the transmitter antenna T1 arrive at the receiver antenna R1 along a line of sight (LOS) pathway and along two other multipaths $M_1$ and $M_2$ which result from the presence of the targets 230, 232. In some cases, the multipath effects introduced by the targets 230, 232 can be time-varying. For example, a target in the multipath channel can be physically moving or it can have some other time-varying characteristic which affects the RF waves received at the receiver. The collective response consisting of effects from the transmitter, the channel, and the receiver can be referred to as the system response, the system impulse response, the system transfer function, the time varying system impulse response, the time-varying system transfer function, etc.

In many applications, multipath signals are undesirable and are often considered to be an, impairment. However, the systems and methods described herein can take advantage of multipath propagation effects (or other effects which occur in other types of frequency-selective channels) to associate pulses received by the receiver 220 with the particular transmitter 210 which sent the pulse. Multipath propagation effects can modify a transmitted signal in many ways, including by introducing (through scattering, reflection, refraction, diffraction, etc.) constructive or destructive interference with associated phase and amplitude complex scaling, time delay, frequency shifting, polarization changes, and/or other effects. The systems and methods described herein can use techniques for identifying, measuring, and/or otherwise analyzing the impact of these effects, or others, to perform signal source association. It should be understood, however, that while various embodiments in this application are described in the context of multipath propagation channels, the systems and techniques described herein are also applicable to other types of frequency-selective channels. For example, the channel could be one in which one (or perhaps more) path(s) are themselves frequency-selective, such as a frequency-selective medium or a frequency selective surface reflection.

The phenomenon referred to herein as polarization mode dispersion can generally be understood as a variation in the polarization state of the received signal as a function of the signal's frequency components (i.e., the polarization state(s) is/are altered distinctly for the different frequency components of the received signal(s)). Polarization mode dispersion can occur, for example, in channels exhibiting both a delay spread between signals carried by orthogonally-polarized waves and power coupling between the polarization modes. One example of polarization mode dispersion is that the channel may couple vertically polarized waves into horizontally polarized waves on paths with different delays relative to the vertically polarized path, possibly in a frequency-dependent fashion, or vice versa. For each polarization mode, the complex transfer function gains (amplitude and phase) in the channel may exhibit distinct variations as a function of frequency, leading to polarization mode dispersion.

In some embodiments, the receiver 220 calculates polarization values for each sub-band of the signals received from various transmission sources. This can be done by, for example, using a dual-polarization antenna to detect orthogonal polarization signal components, and then using frequency-domain representations of the baseband signals to calculate a Jones vector or Stokes parameters (which can be obtained by calculating the Jones coherency matrix). These calculations are known in the art and examples are provided in U.S. Patent Publication 2013/0332115, which is incorporated herein by reference. For example, Stokes parameters ($S_0$, $S_1$, $S_2$, and $S_3$) for each sub-band can be calculated according to the following equations: $S_0=(Y_1 \cdot Y_1^*)+(Y_2 \cdot Y_2^*)$; $S_1=(Y_1 \cdot Y_1^*)-(Y_2 \cdot Y_2^*)$; $S_2=(Y_1 \cdot Y_2^*)+(Y_2 \cdot Y_1^*)$; and $S_3=j(Y_1 \cdot Y_2^*)-j(Y_2 \cdot Y_1^*)$, where $Y_1$ is a complex number with amplitude and/or phase information for a first signal in the pair of signals being compared and $Y_2$ is a complex number with amplitude and/or phase information for a second signal in the pair of signals being compared.) When calculated, using signals from a dual polarization (orthogonally-polarized) antenna, the result of these computations is polarization state information. The polarization information may be computed for each sub-band of the down-converted baseband signals received at the antenna R1. The polarization can be measured in a relative sense, or, if the orientation of the receiver antenna R1 is known, in an absolute sense.

The polarization state information for the frequency sub-bands characterizes the polarization mode dispersion—the frequency-dependency of the polarization mode shifting—caused by the channel or other factors. The polarization values (e.g., the Stokes parameters) for each sub-band can be plotted on or about a Poincaré sphere as a visualization aid. For example, the normalized $S_1$, $S_2$, and $S_3$ Stokes parameters for each sub-band can be taken as coordinates and plotted as a point on the Poincaré sphere (which has a unit radius). Each location on the Poincaré sphere corresponds to a different polarization state. (Orthogonal polarization states are represented by points on opposite sides of the Poincaré sphere.) When the Stokes parameters for multiple sub-bands are plotted, the result is a locus of points which can be referred to as a polarization mode dispersion (PMD) curve.

Figure 3:
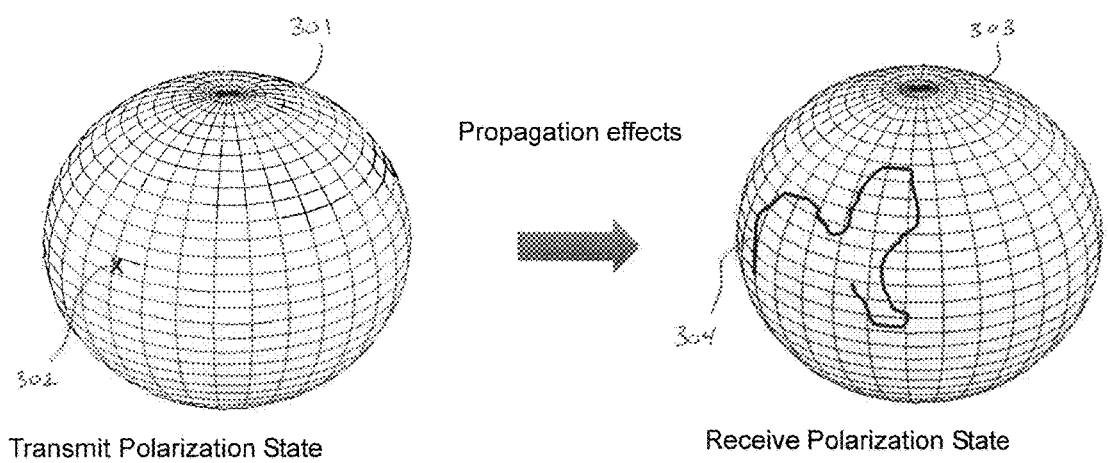
FIG. 3 shows Poincaré spheres which illustrate polarization mode dispersion which can be caused by multipath propagation effects.

FIG. 3 shows Poincaré spheres which illustrate polarization mode dispersion which can be caused by multipath propagation effects. The Poincaré sphere 301 on the left illustrates the transmitted polarization state 302 of a frequency-hopped signal. As indicated by the single "X" on the sphere, the polarization state 302 of the transmitted signal is constant and does not vary as a function of frequency. In other words, with reference to a frequency-hopping communication scheme, the polarization of each pulse transmitted for each frequency hop remains constant. However, as just discussed, the propagation channel between the transmitter and the receiver can induce polarization mode dispersion. This is evident from the Poincaré sphere 303 on the right, which illustrates the polarization state of the received signal as a function of frequency. As already noted, each point on the Poincaré sphere corresponds to a different polarization state. And the illustrated polarization mode dispersion (PMD) curve 304 is made up of the locus of plotted polarization states for each frequency sub-band of the received signal.

Due to frequency-selective effects in the propagation channel, the frequency sub-bands of a signal of a given bandwidth can exhibit different polarization states at the receiver even when, all the frequency sub-bands originate from the transmission source(s) with the exact same polarization. The specific polarization mode dispersion which occurs is in general unique to the specific propagation channel from a given transmission source to the receiver. Since each transmission source may, in general, employ a unique propagation channel to the receiver, signals from each transmission source can be recognized based on their respective representative polarization mode dispersion characteristics.

Figure 4:
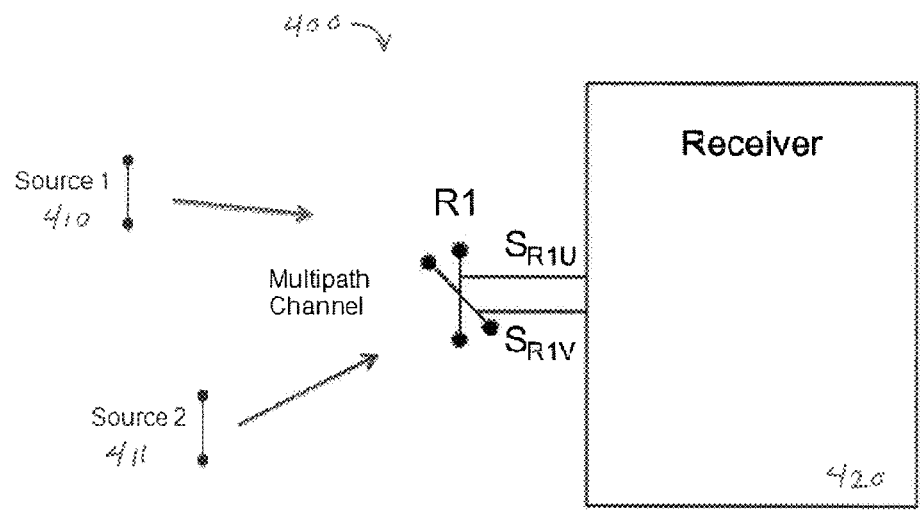
FIG. 4 illustrates a system for characterizing polarization mode dispersion in signals measured at a receiver after propagating through a channel, such as a multipath channel.

FIG. 4 illustrates a system 400 for characterizing polarization mode dispersion in signals measured at a receiver after propagating through a channel, such as a multipath channel, The system 400 illustrated in FIG. 4 includes a first transmission source 410 and a second transmission source 411. The antennas of the transmission sources 410, 411 can have x-polarization, which could arbitrarily be vertical, horizontal, right or left-hand circular, slant ±45°, etc. The system 400 also includes a receiver 420 with a dual polarized receiving antenna R1. The dual polarized receiving antenna R1 is u-polarized and v-polarized, where u and v can represent any pair of orthogonal polarizations, including vertical and horizontal, right and left-hand circular, slant +45° and slant −45°, etc. In some embodiments, either the u- or v-polarization is co-polarized with the x-polarization of the transmitting antennas, but this is not required.

The transmission sources 410, 411 can transmit, for example, frequency-hopping signals according to any technique known in the art. The transmitted signals emitted from the transmission sources 410, 411 begin propagating through the multipath channel as x-polarized RF waves across the full range of frequencies comprising the bandwidth BW of the transmitted signals. The multipath channel induces polarization mode dispersion in these signals. The receiving antenna R1 detects orthogonally-polarized channel-modified versions of the transmitted RF signals. The signal $S_{R1u}$ represents the u-polarized components of the detected signals, whereas the signal $S_{R1v}$ represents the v-polarized components.

In some embodiments, the receiver 420 down-converts the received RF signals and performs analog-to-digital conversion. The down-converted signals can be represented in any suitable form, including as in-phase and quadrature signal components. The down-converted $S_{R1u}$ and $S_{R1v}$ signals can be analyzed sub-band by sub-band. For example, the receiver 420 can perform an N-point fast Fourier transform (FFT), or other suitable transform, to convert the signals into N bins in the frequency domain. Each of these frequency bins can be considered as a sub-band. In the case of a frequency-hopping communication scheme, each sub-band can correspond to one of the frequency channels. However, it is also possible that the sub-bands can be smaller than the frequency channels so that the signal spans multiple sub-bands, and may exhibit polarization mode dispersion across these sub-bands.

In some embodiments, the receiver 420 compares amplitude and/or phase values of the $S_{R1u}$ and $S_{R1v}$ signals on a sub-band by sub-band basis. This can be done, for example, by calculating the polarization state for each sub-band by using the frequency-domain representations of the baseband $S_{R1u}$ and $S_{R1v}$ signals to calculate a Jones vector or Stokes parameters. As already discussed, the Stokes parameters for each sub-band can be plotted on a Poincaré sphere. In general, after a period over which the sources have hopped over all possible frequencies, the plotted points will be distributed on the sphere, resulting in polarization/frequency/amplitude and time correlations that can be used to form polarization mode dispersion curves. The number of curves will generally correspond to the number of transmission sources. If the receiver 420 has received signals from two transmission sources, as shown in FIG. 4, then the calculated polarization state information will correspond to two polarization mode dispersion curves, each curve being representative of the unique multipath channel (or other frequency-dependent channel) between the receiver 420 and a corresponding transmission source.

Figure 5:
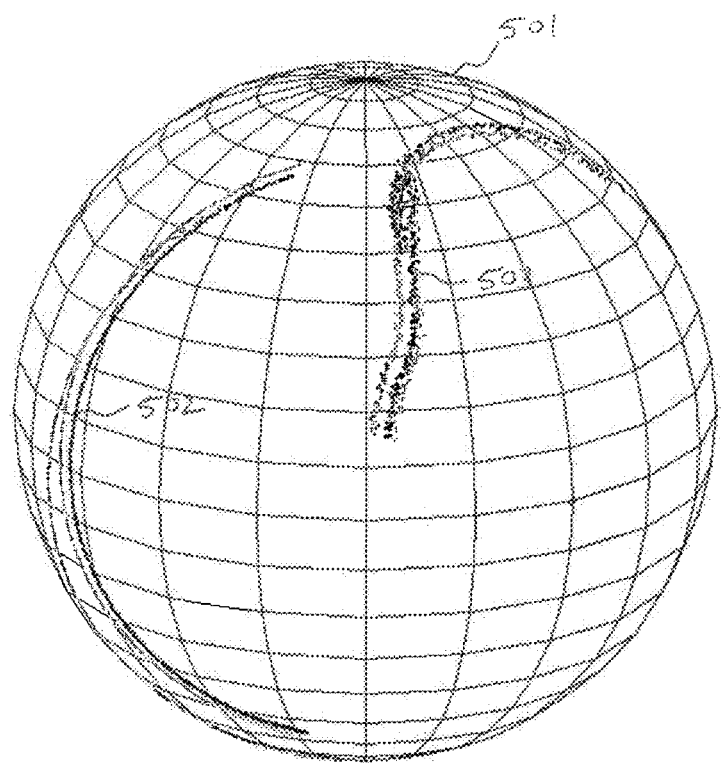
FIG. 5 illustrates an example Poincaré sphere with plotted polarization mode dispersion curves from two transmission sources.

FIG. 5 illustrates an example Poincaré sphere 501 with plotted polarization mode dispersion curves 502, 503 from two transmission sources. As already discussed, the unique channel between each transmission source and the receiver results in a unique polarization dispersion signature corresponding to each transmission source. In FIG. 5, these unique polarization dispersion signatures are represented as polarization mode dispersion curves 502, 503 on the Poincaré sphere. These curves can be obtained by calculating polarization values (e.g., Stokes parameters) from the signals received at the receiver, on a sub-band by sub-band basis.

Each plotted point on the Poincaré sphere corresponds to a polarization state of one frequency sub-band. For each transmission source, the polarization states of neighboring sub-bands tend to be correlated such that their plotted points on the Poincaré sphere are in relatively close proximity, depending upon the signal-to-noise ratio. Thus, the plotted polarization states for the sub-bands of signals transmitted by any given transmission source tends to result in a locus of points that form a polarization mode dispersion curve. And the polarization mode dispersion curves resulting from signals transmitted by different transmission sources may tend to be separable on the Poincaré sphere. This is illustrated in the example in FIG. 5, where the first polarization mode dispersion curve 502 is separate and distinct from, the second polarization mode dispersion curve 503. Each of these curves corresponds to a separate transmission source. Therefore, any subsequent pulse received at the receiver after identifying the dispersion curves can be associated with one of the transmission sources by determining which polarization mode dispersion curve the pulse in question corresponds to.

Coherent Signal Dispersion in Multipath Channels

Figure 6:
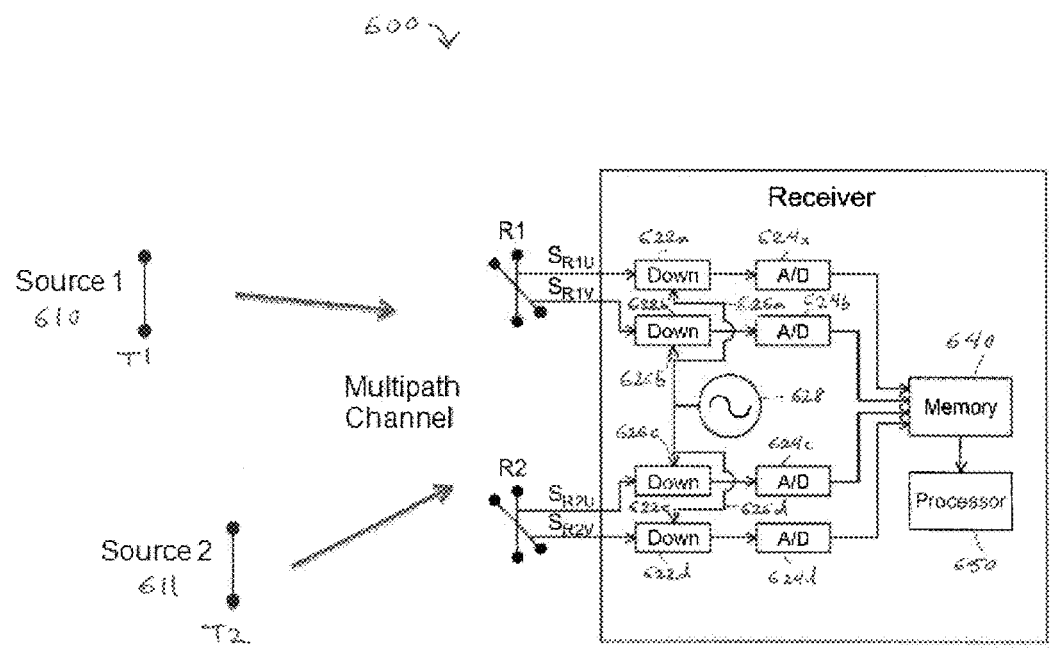
FIG. 6 illustrates a system for analyzing coherent signal dispersion (in a network which includes two transmission sources) by using two spatially-separated, dual polarized receiving antennas.

A more capable system involves the use of additional receive antennas, and analysis of the dispersion between pairs of received signals. FIG. 6 illustrates a system 600 for analyzing coherent signal dispersion (in a network which includes two transmission sources) by using two spatially-separated, dual polarized receiving antennas. (Other antennas can also be used, including arbitrarily polarized antennas, tri-polarized antennas, or even other types of sensors.) Similar to polarization dispersion information, coherent signal dispersion information can be calculated using signal pairs, although the signal pairs are not restricted to solely coming from a single dual polarization antenna. The system 600 includes a first transmission source 510 with a transmitting antenna T1 and a second transmission source 511 with a transmitting antenna T2. The transmitting antennas T1 and T2 can be arbitrarily polarized. The system 600 also includes a receiver 620 with two spatially-separated receiving antennas R1, R2. In some embodiments, the receiving antennas R1, R2 are typically separated by at least 0.5 wavelengths. The two receiving antennas R1, R2 can both be dual polarized. The first dual polarized receiving antenna R1 is u-polarized and v-polarized, where u and v can represent any pair of orthogonal polarizations, including vertical and horizontal, right and left-hand circular, slant +45° and slant −45°, etc. In some embodiments, the second dual polarized receiving antenna R2 is also u-polarized and v-polarized. However, in other embodiments, the orthogonal polarizations of the second receiving antenna R2 can be different than those of the first receiving antenna R1.

The first transmission source 610 transmits a signal $S_{T1}$. The second transmission source 611 transmits a signal $S_{T2}$. These signals can be, for example, frequency-hopping signals. The respective channels between the first and second transmission sources 610, 611 and the receiver 620 can include frequency-selective propagation effects that cause different modified versions of the transmitted signals $S_{T1}$, $S_{T2}$ to be received at the spatially-separated dual polarized receiving antennas R1, R2. The first receiving antenna R1 detects orthogonally-polarized components of channel-modified versions of the transmitted RF signals. The signal notations $S_{R1u}^{T1}$ and $S_{R1u}^{T2}$ can be used to respectively represent the u-polarized component of the detected signals at the first receiving antenna R1 due to the transmitted signals $S_{T1}$ and $S_{T2}$. In general, $S_{R1u}^{T1}$ and $S_{R1u}^{T2}$ may be overlapping in time and/or frequency (collectively referenced as $S_{R1u}$) such that the receiver may need to employ the methods described herein to associate any given received pulse with one of the two transmission sources. Meanwhile, the signals $S_{R1v}^{T1}$ and $S_{R1v}^{T2}$ respectively represent the v-polarized components of the detected signals at the first receiving antenna R1 due to the transmitted signal $S_{T1}$ and $S_{T2}$. Again, in general, $S_{R1v}^{T1}$ and $S_{R1v}^{T2}$ may be overlapping in time and/or frequency (collectively referenced as $S_{R1v}$). In this notation, for any given received signal the subscript indicates the receiving antenna and polarization channel whereas the superscript indicates the transmitted signal which excited that particular received signal. Using this notation, the u-polarization components detected at R2 due to the transmitted signals $S_{T1}$ and $S_{T2}$ can be written as $S_{R2u}^{T1}$ and $S_{R2u}^{T2}$, respectively. These signals can also be overlapping in time and/or frequency (collectively referenced as $S_{R2u}$). And the v-polarization components detected at R2 due to the transmitted signals $S_{T1}$ and $S_{T2}$ can be written $S_{R2v}^{T1}$ and $S_{R2v}^{T2}$, respectively. These signals, too, can be overlapping in time and/or frequency (collectively referenced as $S_{R2v}$). All of these signals can be processed at the receiver 620 in order to analyze the coherent signal dispersion characteristics of the network and perform signal source association.

The receiver 620 can down-convert the received signals $S_{R1u}$, $S_{R1v}$, $S_{R2u}$, and $S_{R2v}$ and perform analog-to-digital conversion. This is done using the down-converters 622a-d and the analog-to-digital converters 624a-d. Each of these components can be connected to, and controlled by, a common local oscillator 628 and/or clock signal (as applicable depending upon the circuitry) in order to maintain consistent phase and/or timing references. For example, the signals can be down-converted using a consistent phase reference and the analog-to-digital converters can take synchronous samples. This helps to ensure that relative phase information between the input signals is preserved in the digitized signals. In addition, the signal lines 626a-d from the local oscillator 628 to these signal components can be matched so as to further help maintain phase coherency in the receiver. Although FIG. 6 illustrates a single local oscillator 628, multiple oscillators can, be used if they are synchronized. The digital signals that are output from the analog-to-digital converters 624a-d can be saved in a memory 640 and sent to a processor 650 for analysis. The processor 650 can conduct the processing required for the signal source association techniques described herein. Though not illustrated, the receiver 620 can also include signal conditioning circuitry, such as amplifiers, filters, etc. In addition, the receiver 620 could include an intermediate frequency (IF) processing stage.

In some embodiments, the received signals are coherently received and analyzed. Phase information can be preserved between the various received signals. For example, the received signals can share a common local oscillator 628 used in the down-conversion processing and the signals can be synchronously sampled during digital conversion. Coherence at the receiver may entail synchronization of the signal channels in various forms, which can include: phase synchronization; frequency synchronization, sampling synchronization; and local oscillator synchronization in frequency, time, and/or phase. Additionally, it may be desirable that the receiver signal channels are gain and phase matched (from the antennas to the analog-to-digital converters) across all frequency components of interest and that the local oscillator signal gains to each channel are substantially matched. In some embodiments, the receiver 620 can advantageously achieve precise control of the phase, amplitude, sampling, and frequency among the various receiver channels.

Although the receiver 620 in FIG. 6 is shown in more detail than the receiver in FIG. 4, each of the receivers discussed herein can include elements and features similar to those discussed with respect to the receiver 620 in order to coherently receive and analyze the received signals.

Once the $S_{R1u}$, $S_{R1v}$, $S_{R2u}$, and $S_{R2v}$ signals are down-converted and sampled, the frequency component phases and amplitudes of the baseband signals can be compared with one another. This can be done in the time domain (e.g., via a filter bank) or in the frequency domain. For example, each of the received signals can be converted into the frequency domain using an N-point FFT operation. This operation divides the bandwidth of each of the down-converted $S_{R1u}$, $S_{R1v}$, $S_{R2u}$, and $S_{R2v}$ signals into N frequency bins. In the case of frequency hopping signals, each frequency bin can correspond to one frequency hopping channel, although it may also be useful to have sub-bands that are smaller than the frequency hopping channels. The respective amplitudes and/or phases of the frequency components of the $S_{R1u}$, $S_{R1v}$, $S_{R2u}$, and $S_{R2v}$ signals can then be compared for each sub-band. For example, the amplitudes of the frequency components of one of the signals can be compared to those of another by calculating ratios of the amplitudes. Similarly, the phases of the frequency components of one of the signals can be compared to those of another by calculating differences between the respective phases. These are just some examples of computations which can be performed to compare the respective amplitudes and/or phases. Many others are also possible. For example, in some embodiments, the respective amplitudes and/or phases of the frequency components of the $S_{R1u}$, $S_{R1v}$, $S_{R2u}$, and $S_{R2v}$ signals can be compared by calculating a Jones vector or Stokes parameters (normalized or unnormalized) for each sub-band using any pair of these signals. Other mathematical computations can also be used to compare the phases and/or amplitudes of the frequency components of any pair of the $S_{R1u}$, $S_{R1v}$, $S_{R2u}$, and $S_{R2v}$ signals.

The following six signal pairs can be formed from the $S_{R1u}$, $S_{R1v}$, $S_{R2u}$, and $S_{R2v}$ signals detected by the receiver 620: $S_{R1u}$ and $S_{R1v}$; $S_{R2u}$ and $S_{R2v}$; $S_{R1u}$ and $S_{R2u}$; $S_{R1u}$ and $S_{R2v}$; $S_{R1v}$ and $S_{R2u}$; or $S_{R1v}$ and $S_{R2v}$. If a selected pair of signals both come from the same dual polarized receiver antenna (as is the case for the first two of the six listed pairs), then the result of a Jones vector or Stokes parameter computation would be polarization information (as already discussed above with respect to FIG. 4). However, because the receiving antennas R1 and R2 are not substantially co-located, nor do they necessarily sample orthogonally-polarized components of the transmitted signal, the result of the Jones vector or Stokes parameter computation does not quantify polarization when the selected pair of signals do not come from the same dual polarized antenna (as is the case for the last four of the six listed pairs). In fact, in these cases the resulting values do not describe any particular known physical quantity. Nevertheless, the comparison of the respective amplitudes and/or phases of the signals received at spatially-separated antennas, for each frequency sub-band, can still provide useful information for signal source association. While the resulting values are not polarization values, they can still be plotted for each sub-band on or about a unit sphere (similar to a Poincaré sphere) as a visualization aid. (If normalization is applied, the signals will fall on a unit sphere, otherwise, in general they will not be confined to a unit sphere.) The resulting locus of points is not a polarization mode dispersion (PMD) curve, however. Instead, the resulting curve can be referred to as a coherent signal dispersion (CSD) curve. Note that frequency/amplitude and time relationships for the polarization states and CSD states can be used to aid in the formation of the PMD and CSD dispersion curves.

The system 600 illustrated in FIG. 6 can therefore provide two polarization mode dispersion manifolds (e.g., a Poincaré sphere which includes dispersion curves for each transmission source) and four additional coherent signal dispersion manifolds. (For purposes of this disclosure, polarization dispersion information can be considered as a special case of the more general coherent signal dispersion information.) Each of these sets of dispersion information can be analyzed, as discussed herein, to perform signal source association. But the techniques described herein are not limited to receivers with two or four channels, as shown in FIGS. 4 and 6, respectively. Even more sets of dispersion information can be provided if the receiver 620 includes more antennas or uses weighted combinations of antenna outputs, for example, as in a phased array system.

Figure 7:
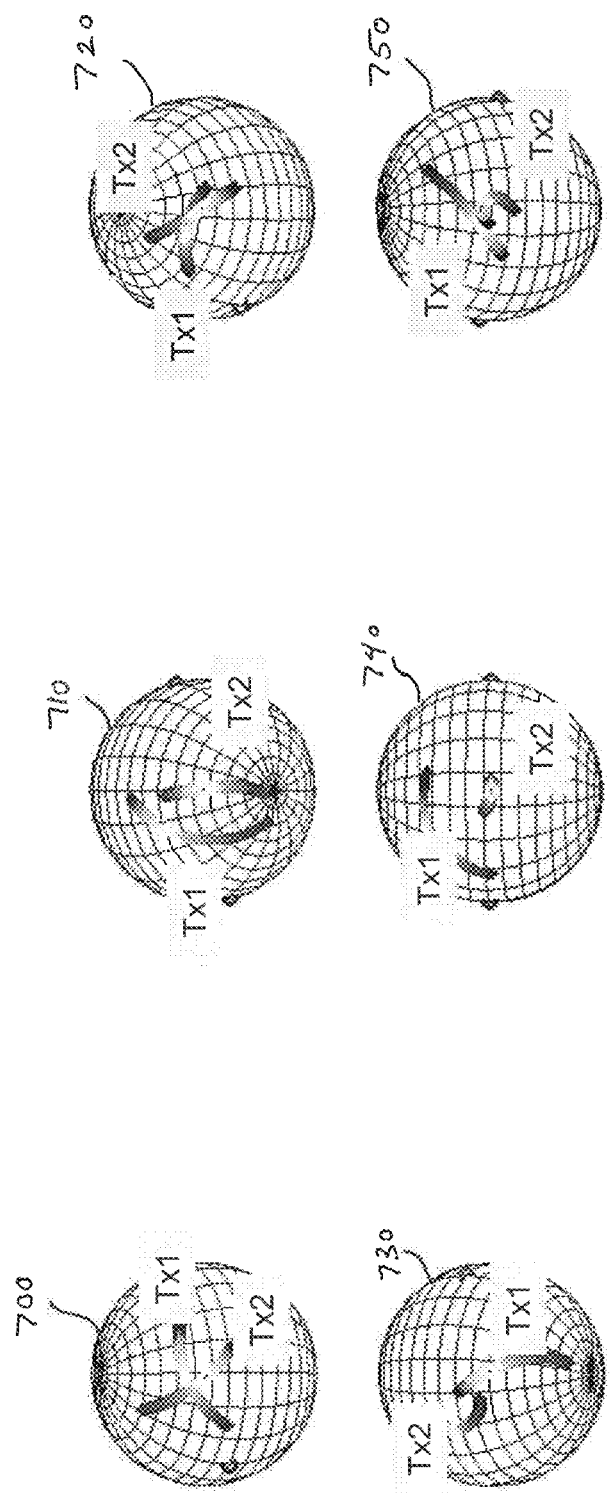
FIG. 7 illustrates six example manifolds showing polarization mode dispersion curves (on two Poincaré spheres) and coherent signal dispersion curves (on the remaining four Poincaré spheres) collected using the system shown in FIG. 6.

FIG. 7 illustrates six example manifolds 700, 710, 720, 730, 740, and 750 showing polarization mode dispersion curves (on two Poincaré spheres) and coherent signal dispersion curves (on the remaining four Poincaré spheres) collected using the system 600 shown in FIG. 6. Each of the curves on each of the spheres is labeled as corresponding to a first transmission source "Tx1" or a second transmission source "Tx2." The data shown on each sphere or manifold corresponds to Stokes parameters calculated, on a sub-band by sub-band basis, from one of the six signal pairs discussed in the preceding paragraph. Thus, as illustrated, each of the signal pairs results in a set of unique polarization mode dispersion curves or coherent signal dispersion curves, which data can be used to perform the signal source association operations discussed herein.

Methods for Signal Source Association

Figure 8:
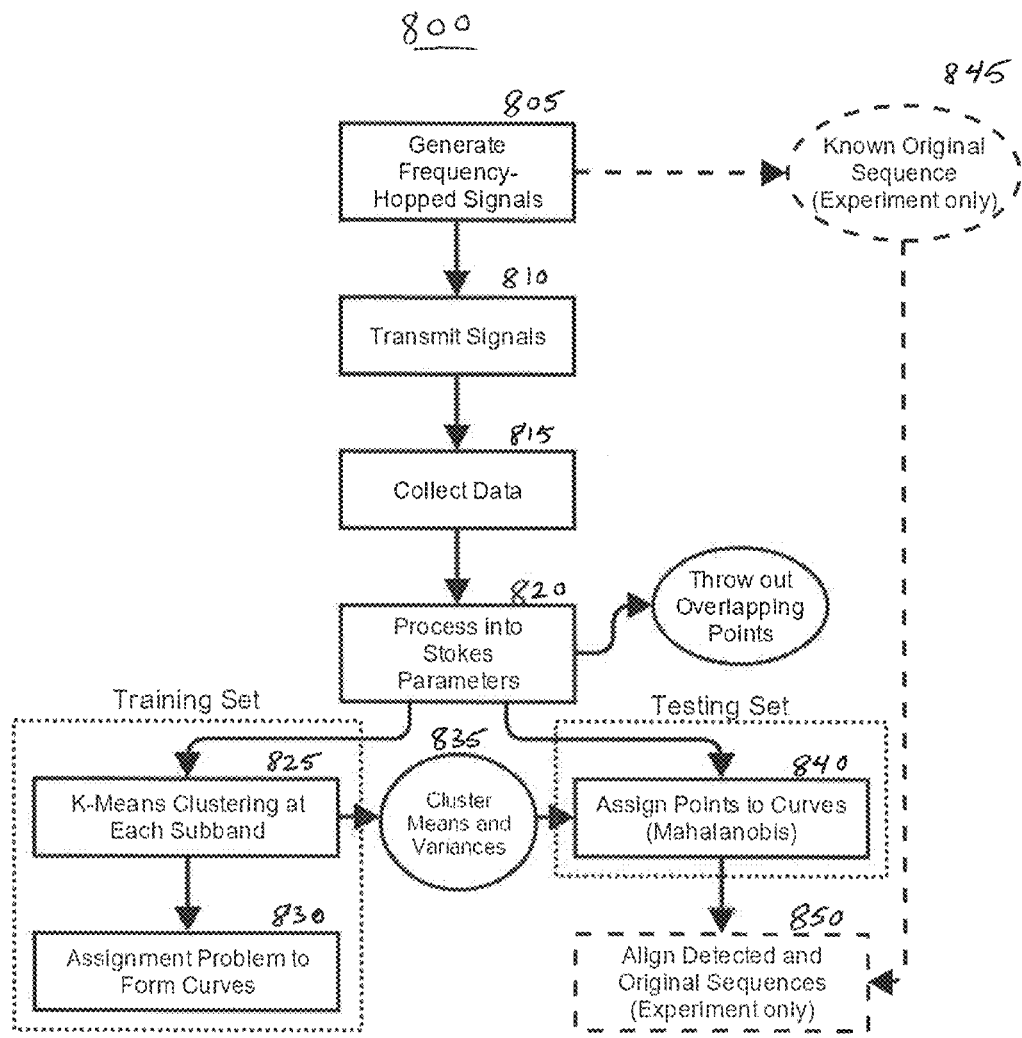
FIG. 8 illustrates an example method for performing signal source association using coherent signal dispersion information.

FIG. 8 illustrates an example method 800 for performing signal source association using coherent signal dispersion information. By way of summary, in some embodiments, a signal source association method includes two phases: a training phase and a testing phase. In the training phase, a receiver forms dispersion curves corresponding to each of the transmission sources on each of the spherical manifolds. This can be done by, for example, determining amplitude and/or phase values for each of a plurality of frequency components of the received signals. Stokes parameters, or other comparison values, can be calculated for one or more pairs of the received signals. The Stokes parameters can then be grouped into dispersion curves. In the case of pulsed transmission signals, the receiver can identify pulses in the signals transmitted by multiple transmission sources. The pulses may be modulated with data or not (e.g., the pulses may be unmodulated frequency tones). Each pulse detected by the receiver can be evaluated to determine its frequency sub-band(s) and to calculate Stokes parameters (or other frequency amplitude and/or phase comparison values). The pulses corresponding to each sub-band can be separated into clusters based on their Stokes parameters. Adjacent clusters can then be associated to form dispersion curves. The number of dispersion curves will generally correspond to the number of transmission sources. Once a dispersion curve for each transmission source has been determined, the training phase is complete and the testing phase begins.

During the testing phase, the receiver continues to receive signals from the transmission sources. The receiver can calculate Stokes parameters (or other comparison values) for these signals on a frequency sub-band by sub-band basis. These Stokes parameters can then be associated with the dispersion curve to which they most closely correspond in order to determine the source of the transmitted signal. In the case of pulsed signals, during the testing phase the receiver can continue to identify pulses in the signals sent by the transmission sources. The receiver can, calculate Stokes parameters for each of these pulses. Based on these Stokes parameters, each, pulse can be associated with the dispersion curve to which it most closely corresponds as measured by a chosen metric. That pulse is then determined as having been transmitted by the transmission source corresponding to the chosen dispersion curve. The dispersion curves determined in the training phase can continually be updated based on the associations that are made.

In other embodiments, the initial training phase is followed by another collection interval (rather than a single pulse observation), and after characterizing all, of the pulses in the collection interval on all manifolds, the correlation among the Stokes (or related quantity for non-polarization comparisons)/frequency/amplitude/time/manifold data among the collected pulses are used to associate the pulses to the training curves. Following these associations, the training curves may be updated for the next collection interval. Additional similar phases can follow to continue associating future pulses. In this manner, changes in each of the dispersion curves with time are inherently tracked.

Yet another embodiment does not employ a training phase, but rather receives signals over an analysis interval. All pulses received in this analysis interval are characterized on all manifolds. The resulting characterizations are then used to associate all pulses received in the analysis interval to their common sources, taking advantage of relationships in Stokes parameters (or related parameters for non-polarization parameters), frequency, amplitude, time, and across manifolds to make associations with their sources.

The example method 800 will now be described in more detail. The method 800 begins at block 805 where multiple transmission sources generate signals to be transmitted. For purposes of describing this method, two transmission, sources are assumed. But the techniques described herein are equally applicable to other numbers of transmission sources. In addition, although block 805 illustrates the generated signals as being frequency-hopped signals, the techniques discussed herein can also be used on other types of signals.

At block 810, the multiple transmission sources transmit the signals which were generated at block 805. The transmitted signals are detected by a receiver that collects the transmitted data at block 815. For purposes of describing this method, the receiver is described as having two channels (e.g., the two channels of a dual polarized antenna, as shown in FIG. 4). However, receivers with more channels (e.g., as shown in FIG. 6) can also be used. In such cases, multiple sets of dispersion information are available to be analyzed by the detector. As the receiver collects data from multiple transmission sources, it may begin performing processing to identify individual pulses. The receiver may also identify the frequency sub-bands which are employed by the transmission sources.

In typical embodiments, pulse identification is performed using leading/trailing-edge detection. The receiver can start by approximating the beginning of a first pulse. The time domain data can be subdivided into windows and each window can be averaged. The window that has the largest increase in power over the previous window can be declared to contain the leading edge of a pulse. Similarly, the window that has the largest decrease in power over the previous window can be declared to contain the trailing edge. The time between the two can be taken as an estimate of the pulse width (PW), and the time between two consecutive leading edges can be taken as an estimate of the pulse repetition interval (PRI). If the receiver can determine the duration of each pulse and the time between pulses, it can analyze each pulse completely without analyzing periods of noise. Other methods for identifying pulses can also be used.

After the receiver has determined the windows in time containing signal pulses, it can transform them into the frequency domain to determine the sub-bands which contain signal energy. For each antenna, the receiver can measure the complex signal received by that antenna, $A_i(t)$. The receiver can perform an FFT on segments of the signal that are T samples long:

$$X_i(f, t) = \sum_{\tau=t-T+1}^{t} A_i(\tau) e^{-2j\pi f \tau / T}$$

In some embodiments, the receiver will set T such that the FFT encompasses the entirety of a pulse, i.e., T equals the pulse duration. Sub-bands which contain signal energy can then be identified and Stokes parameters associated with these signal components can be estimated.

At block 820, the receiver can determine Stokes parameters for each sub-band of the transmitted signals. The receiver can use the frequency-domain signals to obtain the Stokes parameters $S(f,t)$ for each pair of signals:

$$S(f,t) = \begin{bmatrix} S_0(f,t) \\ S_1(f,t) \\ S_2(f,t) \\ S_3(f,t) \end{bmatrix} = \begin{bmatrix} |X_1(f,t)|^2 + |X_2(f,t)|^2 \\ |X_1(f,t)|^2 - |X_2(f,t)|^2 \\ 2\Re(X_1(f,t) X_2^*(f,t)) \\ -2\Im(X_1(f,t) X_2^*(f,t)) \end{bmatrix}$$

The first Stokes parameter, $S_0(f, t)$, is related to the amplitude of the signal. Alternatively, the amplitude information can be ignored, and the receiver can instead use the normalized Stokes parameters, $$\underline{S} = \frac{S}{\sqrt{S_1^2 + S_2^2 + S_3^2}},$$

which are convenient for plotting on the Poincaré Sphere. However, amplitude information is lost by using normalized Stokes parameters.

At blocks 825 and 830, following pulse detection and characterizations during the training interval, the receiver can estimate coherent signal dispersion curves and/or polarization mode dispersion curves for each transmission source on each of the spherical manifolds. One method for accomplishing this is to perform clustering on a sub-band-by-sub-band basis, and then connecting related clusters to form the dispersion curves on each spherical manifold.

Clustering of the detected pulses during training may be achieved, for example, through K-Means Clustering. For each frequency sub-band, and in the case of two transmission sources, the receiver can perform k-means clustering to separate the various detections in each sub-band on each spherical manifold into two clusters. (The number of clusters will generally correspond to the number of transmission sources.) K-means clustering seeks to minimize $$\min_{\mu_j^k} \sum_{j=1}^{2} \sum_{P_i^k \in Z_j^k} \|P_i^k - \mu_j^k\|^2,$$

where $P_i^k$ corresponds to detection i in sub-band k, the $\mu_j^k$ are the cluster means (for j=1, 2 in this case), and $Z_j^k$ is the cluster containing all $P_i^k$ closer to $\mu_j^k$ than any other $\mu^k$. Computation of clusters at each sub-band arbitrarily assigns labels '1' and '2' to the clusters. These labels can later be reassigned so that all sub-bands from one source will share a label. Other methods for clustering the detections in each sub-band and on each spherical manifold can also be used.

Once the clusters have been formed, at block 835 the receiver can find the covariance matrix of each, cluster, which can be used to aid in the synthesis of the dispersion curves:

$$C_j^k = \frac{1}{N} \sum_{P_i^k \in Z_j^k} (P_i^k - \mu_j^k)^T (P_i^k - \mu_j^k).$$

Figure 9:
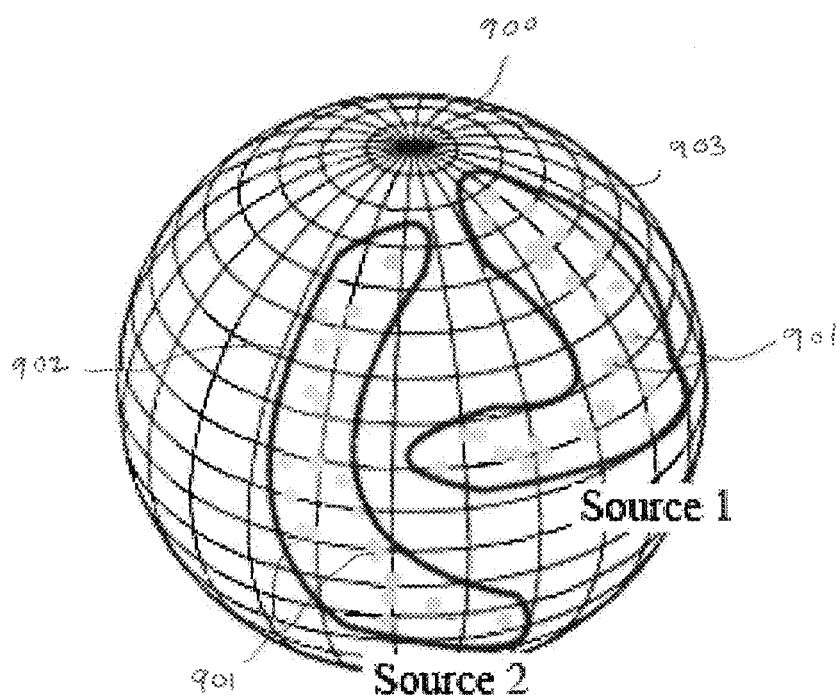
FIG. 9 shows frequency sub-band clusters plotted on a Poincaré sphere and ready to be grouped into dispersion curves.

Identifying Nearest Next-Sub-band Clusters: At block 830, the receiver can assign each of the sub-band clusters to a dispersion curve. (The number of dispersion curves will generally correspond to the number of transmission sources.) After identifying two clusters at each sub-band, frequency (or more clusters if more transmission sources are present), the receiver can reassign clusters such that all clusters with the same label form a polarization mode dispersion curve (or a coherent signal dispersion curve) denoting the polarization-versus-frequency response of the antennas to one of the sources. This problem is illustrated in FIG. 9, which shows frequency sub-band clusters 901 plotted on a Poincaré sphere 900 and ready to be grouped into dispersion curves. The clusters need to be separated into groups 902, 903. Each of these groups 902, 903 corresponds to a dispersion curve for one of the transmission sources.

One solution to the assignment problem for sub-bands that are adjacent in frequency involves minimizing the cost function $R^k$:

$$R^k = \sum_{i \in A} \sum_{j \in T} M^k(i, j) x_{ij},$$

where, for an N-source problem, $A=\{1, \ldots, N\}$ and $T=\{1, \ldots, N\}$; the cost matrix $M^k(i; j)$ employs the Bhattacharyya distance between clusters $Z_i^{k-1}$ and $Z_j^k$, $$M^k(i, j) = \frac{1}{8} (\mu_i^{k-1} - \mu_j^k)^T K^{-1} (\mu_i^{k-1} - \mu_j^k) + \frac{1}{2} \ln\left( \frac{\det K}{\sqrt{\det C_i^{k-1} \det C_j^k}} \right),$$

where μ and C are as defined above, and $$K = \frac{C_i^{k-1} + C_j^k}{2}; \text{ and } \sum_{j \in T} x_{ij} = 1 \text{ for all } i \in A,$$

$$\sum_{i \in A} x_{ij} = 1 \text{ for all } j \in T, x_{ij} \in \{0, 1\} \text{ for all } i, j \in A, T.$$

For each i, there is one unique j that helps to minimize $R^k$; the jth cluster is then assigned to source i. The receiver can begin this problem at k=2, having arbitrarily assigned the clusters in k=1, and iterate up to k=q where q is the total number of sub-bands.

In the relatively simple case of two sources it is simply a matter of determining whether the set [i, j]={[1, 1], [2, 2]} or [i, j]={[1, 2], [2, 1]} minimizes $R^k$.

With more transmission sources, other embodiments may employ an algorithm such as the Hungarian algorithm to solve the cluster assignment problem. With the Hungarian Algorithm, the receiver can form the set S of all cluster means in sub-band k that have already been assigned to curves and the set T of all cluster means in sub-band k+1 that need to be assigned. Each i∈S has a potential y(i), and each j∈T has a potential y(j). The cost of connecting i to j is c(i, j). y is a potential as long as for all i∈S, j∈T we have y(i)+y(j)≤(i, j). A tight edge is any edge connecting i to j such that y(i)+y(j)=c(i, j). The objective is to form a perfect matching of all i∈S to all j∈T that minimizes the total c(i, j) of all edges in the matching.

The group of all, edges is called $G_y$, and each edge has an orientation (denoted as $\vec{G}_y$). We also define M to be the matching containing all edges oriented from T to S. The receiver can initialize the problem such that all edges are oriented from S to T (and M is therefore empty). Let $R_S \subseteq S$ and $R_T \subseteq T$ be the vertices in S and T, respectively, not included in M. Let Z be the vertices in T that are reachable from S using only directed paths along tight edges.

If $R_T \cap Z$ is not empty, then reverse the orientation of an edge from $R_S$ to $R_T$. This increases the size of M by 1.

If $R_T \cap Z$ is empty, then define $\Delta=\min\{c(i, j)-y(i)-y(j): i \in Z \cap S, j \in T \cap Z\}$. We add this $\Delta$ To all $\{y(i): i \in Z \cap S\}$ and subtract it from all $\{y(j): j \in Z \cap T\}$.

The receiver can repeat until M is a perfect matching, which is also the matching that minimizes $\Sigma_{v \in S \cup T} y(v)$ since every edge in the matching is a tight edge. Other assignment algorithms can also be used.

Once clusters have been assigned to a dispersion curve on each manifold, the training phase can be concluded.

Then, at block 840, the receiver can begin associating received pulses to the dispersion curves determined in the training phase. This can be referred to as the testing phase, wherein the receiver uses the dispersion curves determined during the training phase to associate signals or pulses to one of the transmission sources.

Frequency Hopping Pulse Association: After the dispersion curves have been generated from the training set, in some embodiments, the receiver continues to detect signals. For the coherent state of each new detected signal $P_i^k$, the receiver can assign the signal to the cluster with the shortest Mahalanobis distance to the coherent state of the detected signal:

$$(D_{i,j}^k)^2 = (\mu_j^k - P_i^k)^T (C_i^k)^{-1} (\mu_j^k - P_i^k)$$

The Mahalanobis distance essentially measures how many standard deviations away a coherent state is from a distribution of points that form a dispersion curve. This distance, or some other metric, can be used to assign transmitted pulses to one of the transmission sources. This can be done by, for example, calculating Stokes parameters for each sub-band of a signal or each pulse and then determining which dispersion curve those Stokes parameters most closely correspond to (e.g., as measured by the shortest Mahalanobis distance). Since multiple spherical manifolds may be available to aid in the association problem, the Mahalanobis distance can be computed on each sphere, and these distances can be used to determine pulse-source associations.

Blocks 845 and 850 in FIG. 8 are applicable in the situation where an experiment is being conducted to test the performance of the receiver. In such instances, the frequency hopping sequences of each transmission source are known (block 845) and may be compared with the sequences determined by the receiver (block 850) in order to test its accuracy.

Figure 10:
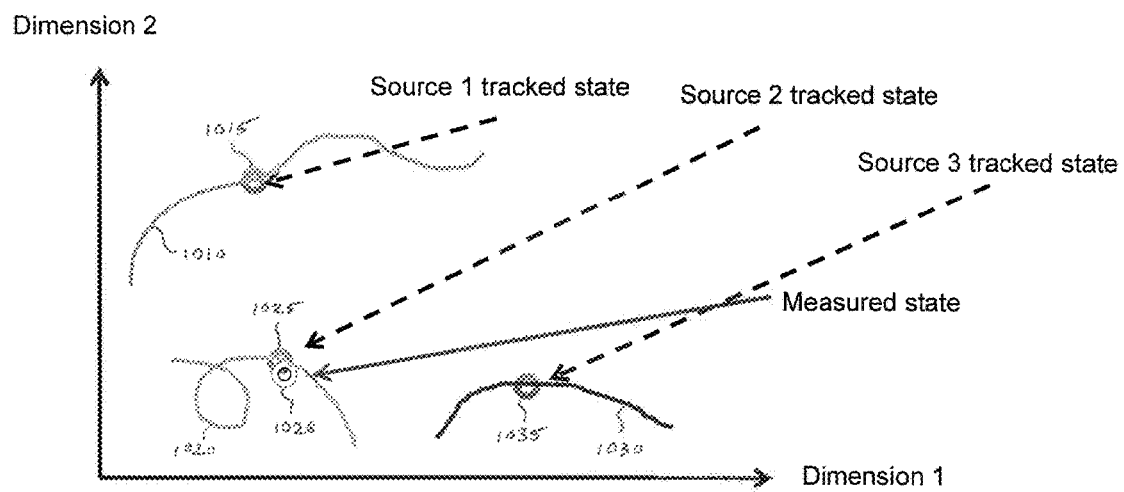
FIG. 10 illustrates an example of signal source association by comparing the current measured state of a test pulse with tracked dispersion curves from a training phase.

FIG. 10 illustrates an example of signal source association by comparing the current measured state of a test pulse with tracked dispersion curves from a training phase. The graph shows dispersion curves 1010, 1020, 1030 for three different transmission sources. These dispersion curves are illustrated in the plane of "Dimension 1" and "Dimension 2," which could correspond to any of the manifolds that result from considering different pairs of receiver signals, as discussed above with respect to FIGS. 6 and 7.

The dispersion curves shown in FIG. 10 can be identified during a training phase, as discussed herein. The ring 1015 on the dispersion curve 1010 indicates the tracked state for a given frequency sub-band for the first transmission source. Similarly, the rings 1025 and 1035 respectively indicate the tracked states for that same frequency sub-band on the dispersion curves 1020, 1030 for the second and third transmission sources.

Meanwhile, the ring 1026 shows the measured state of a detected pulse during the testing phase. As discussed herein, the receiver can associate this detected pulse with one of the three tracked transmission sources by determining which dispersion curve the measured state of the pulse most closely corresponds to. This can be done by, for example, calculating a metric of the distance between the measured state 1026 of the pulse and each of the three tracked states 1015, 1025, and 1035 for the particular pulse's frequency sub-band. Of the three possible tracked states for this particular frequency sub-band, the measured state 1026 for this pulse is closest to the tracked state 1025 for the second transmission source. Thus, the detected pulse can be determined to have been transmitted by the second transmission source. In some embodiments, dispersion curves and measured states on all manifolds can be used to associate the pulse.

In some embodiments, the distance metric that is used to associate a measured state with a tracked dispersion curve can take into account the signal-to-noise ratios for the measurements corresponding to each transmission source. This is illustrated in FIG. 11.

Figure 11:
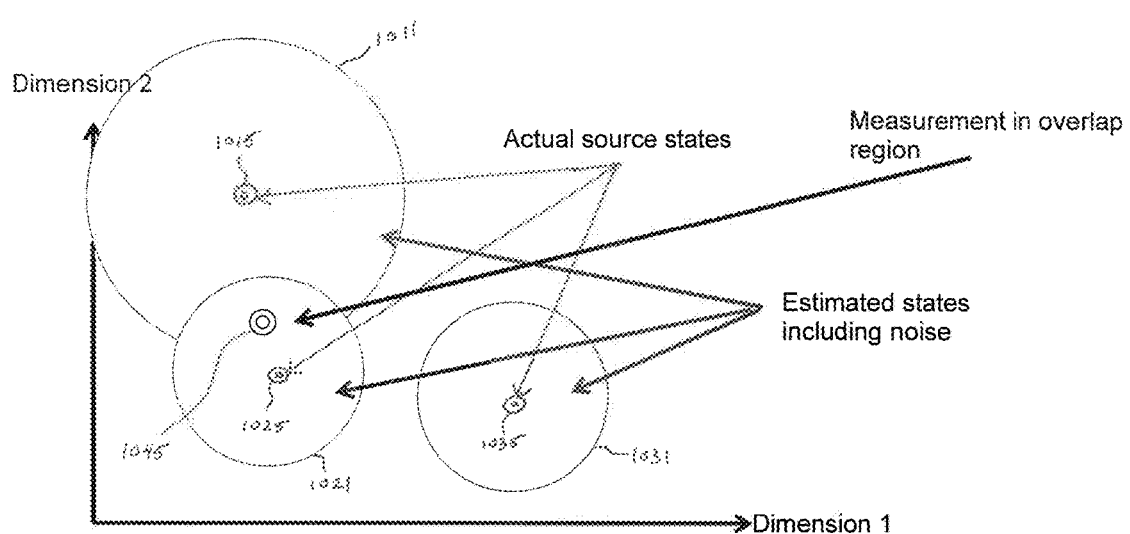
FIG. 11 shows how signal-to-noise ratios can affect signal source associations using the techniques described herein.

FIG. 11 shows how signal-to-noise ratios can affect signal source associations using the techniques described herein. FIG. 11 shows the same tracked states 1015, 1025, and 1035 for a given frequency sub-band as are illustrated in FIG. 10. FIG. 11 also shows detection regions 1011, 1021, and 1031 for these tracked states in the presence of noise. The detection region 1011 for the tracked state 1015 for the first transmission source is the region inside which a noisy measurement of a pulse from the first transmission source is likely to be located. This detection region 1011 for the first transmission source is relatively large, which indicates a relatively poor signal-to-noise ratio for pulses of this particular frequency sub-band from the first transmission source. Similarly, the detection regions 1021, 1031 for the tracked states 1025, 1035 for the second and third transmission sources are the respective regions where noisy measurements of pulses from the second and third transmission sources are likely to be found. The detection regions 1021 and 1031 for the second and third transmission sources are both smaller than the detection region 1011 for the first transmission source. This is indicative of better signal-to-noise ratios for measurements of pulses of the illustrated frequency sub-band from the second and third transmission sources. FIG. 11 therefore illustrates that the detection regions for each transmission source can be varied in size to compensate for different signal-to-noise ratios for measured pulses from different transmission sources. The signal-to-noise ratios for each transmission source can be determined during the training phase by, for example, measuring the spread of measured polarization states for the clustered pulses of each frequency sub-band. These signal-to-noise ratios can then be used to appropriately set the detection region for each transmission source.

FIG. 11 also illustrates a complication that can arise when the tracked states for pulses of a given frequency sub-band are too similar for a pair of transmission sources. For example, FIG. 11 shows that the detection regions 1011 and 1021 for the first and second transmission sources overlap. If a pulse is detected whose measured state 1045 falls within the overlapping area of the two detection regions, then there is an ambiguity in terms of which transmission source the detected pulse should be associated with. However, as discussed below with respect to FIG. 13, it may be possible to resolve this type of ambiguity by using the dispersion data on a different manifold that results from considering a different pair of receiver signals.

Figure 12A:
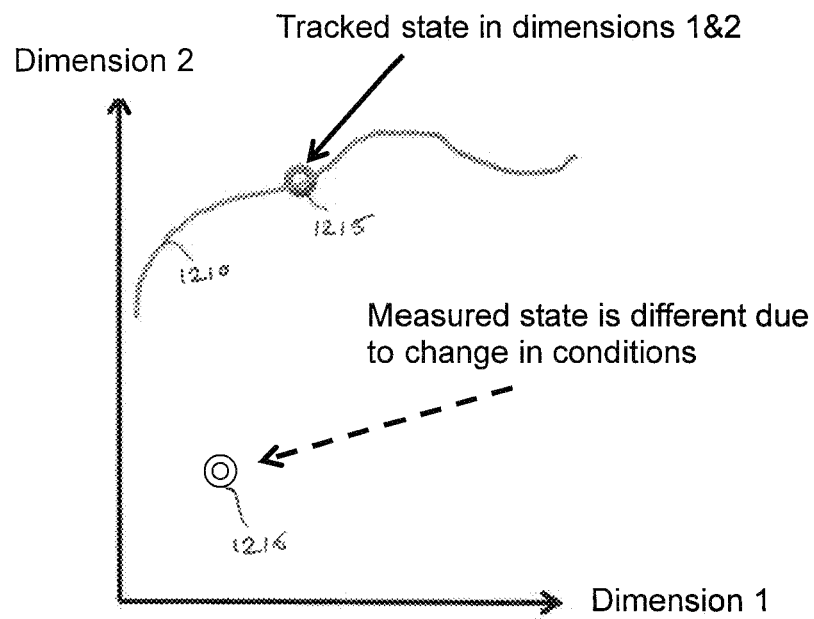
FIGS. 12A and 12B illustrate a complication that can arise when the channel conditions between a given transmission source and the receiver change over time.
Figure 12B:
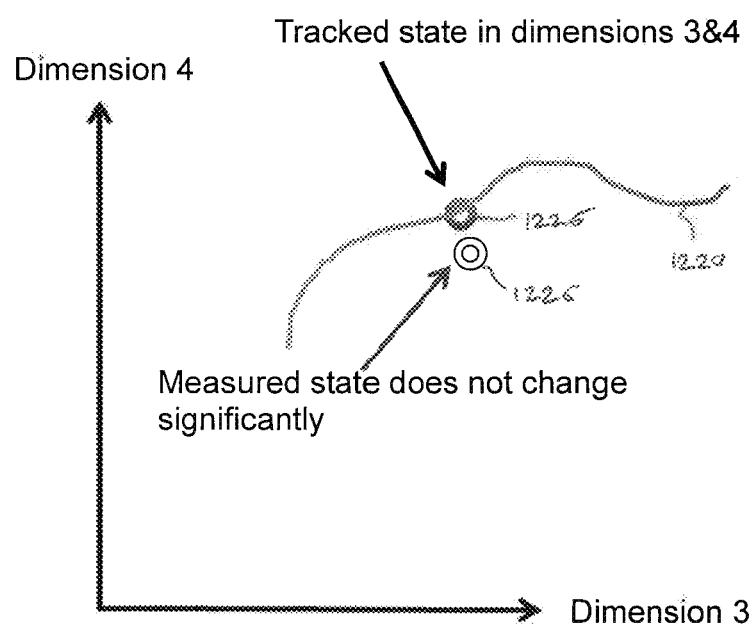

FIGS. 12A and 12B illustrate a complication that can arise when the channel conditions between a given transmission source and the receiver change over time. FIG. 12A illustrates a dispersion curve 1210. This dispersion curve is tracked in Dimensions 1 and 2. Again, these dimensions arbitrarily refer to any of the manifolds which result from considering different pairs of signals at the receiver. (See, for example, the six manifolds in FIG. 7 which result from the six different signal pairs which are available from using the receiver architecture shown in FIG. 6.) The ring 1215 indicates the tracked state for a particular frequency sub-band on the dispersion curve 1210. As already discussed above, the dispersion curve 1210 for a particular transmission source is dependent upon the channel between the transmission source and the receiver. If the channel changes over time (e.g., due to relative movement between the transmission source and the receiver, or motion of an object in the channel), then the corresponding dispersion curve will also change. When the channel changes, it is possible that the measured state 1216 of a pulse will no longer correlate well with the tracked state 1215 for pulses of that particular frequency sub-band and transmission source. This is shown in FIG. 12A by the relatively large distance between the measured state 1216 and the tracked state 1215. This increased separation between the measured and tracked states can result in reduced pulse association performance. Various methods exist to overcome this. For example, the dispersion curves can be updated as associations are made. Alternatively, as previously discussed, the training period can be followed by successive intervals over which dispersion curves can be estimated, and then the resulting dispersion curves can be associated with the dispersion curves obtained in training. Each subsequent interval can use the previous assignments as the "new" training curves.

Although a dispersion curve measured in one of the available manifolds may change drastically in response to changes in the channel, this does not necessarily mean that dispersion curves in other manifolds will experience the same degree of change due to changing channel conditions. This is shown in FIG. 12B. FIG. 12B illustrates a dispersion curve for the same transmission source, but this dispersion curve is tracked in Dimensions 3 and 4 by considering a different pair of receiver signals than in FIG. 12A. As shown in FIG. 12B, the new channel conditions which resulted in relatively wide separation between the measured and tracked states in Dimensions 1 and 2 (FIG. 12A) only results in a relatively small distance between measured and tracked states 1226 and 1225 in Dimensions 3 and 4 (FIG. 12B). Thus, by considering the same measured pulse in new dimensions, it can be appropriately associated with the correct transmission source. FIG. 12B therefore illustrates that signal source association performance can be improved by jointly considering the dispersion data that results from performing the calculations described herein using multiple different signal pairs.

Figure 13:
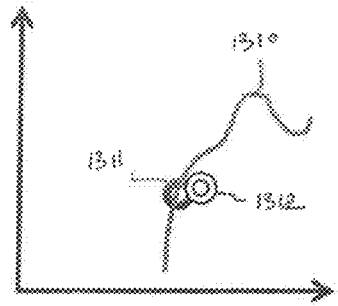
FIG. 13 illustrates the advantageous diversity in dispersion data that can be calculated using different pairs of receiver signals.
Figure 13:
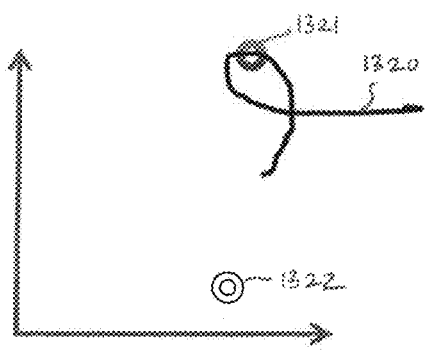
Figure 13:
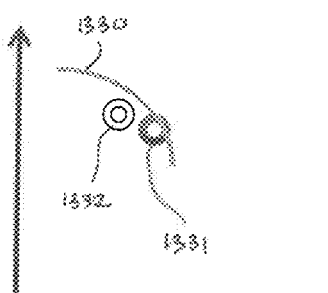

FIG. 13 illustrates the advantageous diversity in dispersion data that can be calculated using different pairs of receiver signals. The amount of dispersion data available to a receiver for performing signal source association can be increased by using multiple antennas to detect the signals from the transmission sources. For example, as discussed above with respect to FIGS. 6 and 7, a receiver architecture with two spatially-separated dual polarization antennas can provide six different sets of dispersion data. FIG. 13 illustrates maps of three of these sets of dispersion data, each corresponding to a different pair of receiver signals. As shown in these maps, the dispersion curves 1310, 1320, and 1330 that are calculated using different signal pairs may vary widely despite all corresponding to the same transmission source. Similarly, the tracked states 1311, 1321, and 1331 for pulses of a given frequency sub-band may vary widely, as may the measured states 1312, 1322, and 1332 of newly detected pulses. This diversity in dispersion data can be used to overcome the signal source association ambiguities which may result in one manifold due to overlapping dispersion curves, poor signal-to-noise ratio, or changing channel conditions. For example, in Map 2 of FIG. 13, there is a relatively wide disparity between the measured state 1322 and the tracked state 1321 for a particular pulse. But any ambiguity which may result from considering the data in Map 2 can be resolved, by also consider the data in Map 1 or Map 6, which both enjoy relatively close correlations between the, measured and tracked states.

One example application of the signal source association techniques described herein is wireless network security. This application relates to the properties of coherent signal dispersion (CSD) curves which allow the source(s) of one or more transmitted signals to be distinguished without necessarily having any information as to the data content of the transmitted signal(s). For example, two different transmitters could transmit the same data to the same receiver from different physical locations. The resulting CSD curves would be different for each transmitter because of their different multipath channel, geometries. Since the CSD curves are largely characteristic of the multipath environment and not necessarily the specific signal that is transmitted, it is possible to distinguish the source of a transmitted signal based on its CSD curves independent of the actual content of the transmitted signal. In other words, if multiple sources are transmitting to a receiver of the sort described herein, these sources can be distinguished from one another based on the different characteristics of their CSD curves. This capability has important implications for applications such as security for wireless data transmissions.

For example, imagine that a receiver of the sort described herein is integrated into a wireless router that provides Internet access. Multiple users can connect to the Internet through the wireless router using mobile devices. Once each user has established a connection to the wireless router, the CSD curves associated with the multipath channel seen by that user can be identified. Even if the user moves to a new location such that a new effective multipath channel is established (consequently leading to new CSD curves), the CSD curves associated with one location will generally be correlated with those from a slightly different location. Thus, if the CSD curves for the user are monitored over time and tracked, that user can still be identified based on the CSD curves associated with his or her connection to the wireless router even as the user moves about. Now, suppose that a second user attempts to impersonate the first user. For example, suppose that the second user has successfully stolen the first user's authentication credentials and transmits them to a secure website via the wireless router in an attempt to gain access to the first user's private data. Notwithstanding the fact that the first and second users may transmit the exact same information, they can still be distinguished based on the different CSD curves associated with their respective connections to the wireless router. Accordingly, the second user's attempt to gain access to the first user's private information can be rejected if the CSD curves associated with this transmission do not match those associated with the first user's transmissions. In this way, the CSD curve analysis described herein can provide a very strong measure of security to wireless communications. The same techniques could be practiced in any wireless network, including cellular networks.

Although the discussion herein generally refers to RF signals to make the measurements described herein, it should be understood, that the concepts can equally apply to other types of signals, including signals carried by various types of electromagnetic radiation such as infrared or visible light signals, ultraviolet signals, or x-ray signals. In addition, the concepts described herein can apply to transmission lines or to signals carried by other types of wave phenomena besides electromagnetism, such as acoustic signals, etc. Furthermore, in place of, or in addition to antennas to measure the electric field, alternative sensors could be employed to measure the magnetic field. Thus, the systems described herein can be adapted to operate using different types of signals.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using, for example, computer software, hardware, firmware, or any combination of software, hardware, and firmware. Software modules can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

A skilled artisan will also appreciate, in light of this disclosure, that multiple distributed computing devices can be substituted for any one computing device illustrated herein. In such distributed embodiments, the functions of the one computing device are distributed such that some functions are performed on, each of the distributed computing devices.

While certain embodiments have been explicitly described, other embodiments will become apparent, to those of ordinary skill in the art based on this disclosure, Therefore, the scope of the invention is intended to be defined by reference to the claims and not simply with regard to the explicitly described embodiments.

What is claimed is:

1. A signal source association method comprising:
using a receiver to detect a plurality of signals;
detecting a plurality of training pulses from the plurality of signals during a training phase;
determining amplitude and phase information for one or more frequency components of the training pulses;
determining a set of one or more comparison values for the training pulses by comparing the respective amplitude and phase information from the training pulses for one or more pairs of the plurality of signals;
grouping comparison values for the training pulses in clusters;
grouping the clusters to form a plurality of dispersion curves, each of the dispersion curves corresponding to one of a plurality of transmission sources;
detecting a testing pulse from the plurality of signals during a testing phase;
determining amplitude and phase information for one or more frequency components of the testing pulse;
determining a set of one or more comparison values for the testing pulse by comparing the respective amplitude and phase information from the testing pulse for one or more pairs of the plurality of signals;
determining to which of the plurality of dispersion curves the set of comparison values for the testing pulse corresponds; and
identifying the transmission source which transmitted the testing pulse based on the dispersion curve corresponding to the set of comparison values for the testing pulse.

2. The method of claim 1, wherein the comparison values comprise Stokes parameters.

3. The method of claim 1, further comprising:
determining a set of comparison values for the testing pulse for each of multiple pairs of the plurality of signals; and
identifying the transmission source which transmitted the testing pulse using the multiple sets of comparison values for the testing pulse.

4. The method of claim 1, wherein the one or more pairs of the plurality of signals comprise a pair of signals detected from orthogonally polarized antenna elements.

5. The method of claim 1, wherein the one or more pairs of the plurality of signals comprise a pair of signals detected from spatially-separated antennas.

6. The method of claim 1, wherein the plurality of signals comprise frequency-hopped signals or frequency-agile signals.

7. The method of claim 1, wherein grouping the comparison values for the training pulses in clusters comprises using a k-means clustering algorithm.

8. The method of claim 1, wherein grouping the clusters to form the plurality of dispersion curves comprises using the Hungarian algorithm.

9. The method of claim 1, wherein determining to which of the plurality of dispersion curves the set of comparison values for the testing pulse corresponds comprises calculating a metric of the distance between the corresponding dispersion curve and a point corresponding to at least one of the comparison values for the testing pulse.

10. The method of claim 1, wherein the plurality of signals comprise wireless communications signals, radar signals, or any other electromagnetic emission.

11. The method of claim 1, wherein the plurality of signals are detected using one or more arbitrarily polarized antennas, dual-polarized antennas, tri-polarized antennas, or other sensors.

12. A receiver for performing signal source association, the receiver comprising:
two or more input ports for obtaining a plurality of signals; and
a processor configured to
detect a plurality of training pulses from the plurality of signals during a training phase;
determine amplitude and phase information for one or more frequency components of the training pulses;
determine a set of one or more comparison values for the training pulses by comparing the respective amplitude and phase information from the training pulses for one or more pairs of the plurality of signals;
group comparison values for the training pulses in clusters;
group the clusters to form a plurality of dispersion curves, each of the dispersion curves corresponding to one of a plurality of transmission sources;
detect a testing pulse from the plurality of signals during a testing phase;
determine amplitude and phase information for one or more frequency components of the testing pulse;
determine a set of one or more comparison values for the testing pulse by comparing the respective amplitude and phase information from the testing pulse for one or more pairs of the plurality of signals;
determine to which of the plurality of dispersion curves the set of comparison values for the testing pulse corresponds; and
identifying the transmission source which transmitted the testing pulse based on the dispersion curve corresponding to the set of comparison values for the testing pulse.

13. The receiver of claim 12, wherein the comparison values comprise Stokes parameters.

14. The receiver of claim 12, wherein the processor is further configured to:
determine a set of comparison values for the testing pulse for each of multiple pairs of the plurality of signals; and
identifying the transmission source which transmitted the testing pulse using the multiple sets of comparison values for the testing pulse.

15. The receiver of claim 12, wherein the one or more pairs of the plurality of signals comprise a pair of signals detected from orthogonally polarized antenna elements.

16. The receiver of claim 12, wherein the one or more pairs of the plurality of signals comprise a pair of signals detected from spatially-separated antennas.

17. The receiver of claim 12, wherein the plurality of signals comprise frequency-hopped signals or frequency-agile signals.

18. The receiver of claim 12, wherein grouping the comparison values for the training pulses in clusters comprises using a k-means clustering algorithm.

19. The receiver of claim 12, wherein grouping the clusters to form the plurality of dispersion curves comprises using the Hungarian algorithm.

20. The receiver of claim 12, wherein determining to which of the plurality of dispersion curves the set of comparison values for the testing pulse corresponds comprises calculating a metric of the distance between the corresponding dispersion curve and a point corresponding to at least one of the comparison values for the testing pulse.

21. The receiver of claim 12, wherein the plurality of signals comprise wireless communications signals, radar signals, or any other electromagnetic emission.

22. The receiver of claim 12, wherein the plurality of signals are detected using one or more arbitrarily polarized antennas, dual-polarized antennas, tri-polarized antennas, or other sensors.

23. A signal source association method comprising:
using a receiver to detect a plurality of signals;
determining amplitude and phase information for one or more frequency components of at least a portion of each of the plurality of signals;
determining a set of one or more comparison values by comparing the respective amplitude and phase information from one or more pairs of the plurality of signals;
determining to which of a plurality of dispersion curves the set of comparison values corresponds by calculating a metric of the distance between the corresponding dispersion curve and a point corresponding to at least one of the comparison values; and
associating at least a portion of the signals with one of a plurality of transmission sources based on the dispersion curve corresponding to the set of comparison values.

24. A receiver for performing signal source association, the receiver comprising:
two or more input ports for obtaining a plurality of signals; and
a processor configured to
determine amplitude and phase information for one or more frequency components of at least a portion of each of the plurality of signals;

determine a set of one or more comparison values by comparing the respective amplitude and phase information from one or more pairs of the plurality of signals;

determine to which of a plurality of dispersion curves the set of comparison values corresponds by calculating a metric of the distance between the corresponding dispersion curve and a point corresponding to at least one of the comparison values; and associate at least a portion of the signals with one of a plurality of transmission sources based on the dispersion curve corresponding to the set of comparison values.

* * * * *